United States Patent
Dhong et al.

(10) Patent No.: US 6,178,437 B1
(45) Date of Patent: Jan. 23, 2001

(54) METHOD AND APPARATUS FOR ANTICIPATING LEADING DIGITS AND NORMALIZATION SHIFT AMOUNTS IN A FLOATING-POINT PROCESSOR

(75) Inventors: Sang Hoo Dhong; Hung Cai Ngo, both of Austin; Kevin John Nowka, Round Rock, all of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/139,940

(22) Filed: Aug. 25, 1998

(51) Int. Cl.[7] ................. G06F 7/42; G06F 7/00
(52) U.S. Cl. .......................... 708/505; 708/205
(58) Field of Search ....................... 708/205, 495, 708/505

(56) References Cited

U.S. PATENT DOCUMENTS

| | | | |
|---|---|---|---|
| 5,204,825 | * | 4/1993 | Ng ............................ 708/205 |
| 5,282,156 | * | 1/1994 | Miyoshi et al. ............. 708/205 |
| 5,317,527 | * | 5/1994 | Britton et al. .............. 708/505 |
| 5,493,520 | | 2/1996 | Schmookler et al. . |
| 5,798,952 | * | 8/1998 | Miller, Jr. etr al. ......... 708/205 |
| 5,831,884 | * | 11/1998 | Suzuki ....................... 708/205 |

* cited by examiner

Primary Examiner—Tan V. Mai
(74) Attorney, Agent, or Firm—Casimer K. Slays; Felsman, Bradley, Vaden, Gunter & Dillon, LLP

(57) ABSTRACT

A method for anticipating leading zeros/ones in a floating-point processor is disclosed. A leading zeros string and a leading ones string is generated by examining carry propagates, generates, and kills of two adjacent bits of two input operands to an adder within a floating-point processor. The leading zeros string is for a positive sum, and the leading ones string is for a negative sum. A normalization shift amount is calculated directly and concurrently from the leading zeros string and the leading ones strings prior to a determination of a sign of an output of the positive sum and the negative sum.

6 Claims, 3 Drawing Sheets

METHOD AND APPARATUS FOR ANTICIPATING LEADING DIGITS AND NORMALIZATION SHIFT AMOUNTS IN A FLOATING-POINT PROCESSOR

BACKGROUND OF THE INVENTION

1. Technical Field

The present invention relates to a method and apparatus for data processing in general, and in particular to a method and apparatus for performing result normalization in a floating-point processor. Still more particularly, the present invention relates to a method and apparatus for anticipating leading zeros/ones in a floating-point processor.

2. Description of the Prior Art

Normalization is the removal of leading zeros or leading ones from a respective positive or negative output of a floating-point adder. Full-precision leading-zero anticipators (LZA) (or leading-zero predictors) are commonly utilized to improve the speed of the normalization process. An LZA can be the most critical path of a floating-point adder because it is not obvious a priori whether the result from the adder will be positive or negative. Thus, it is necessary to perform both leading-zero and leading-one analysis, and select the proper normalization shift amount based upon the sign of the result when the result is finally available.

According to the IEEE 754 standard, floating-point numbers are represented by three elements, namely, a binary sign bit, a binary encoded exponent, and a binary encoded mantissa. In a normalized floating-point number, the exponent is that which ensures the first digit of the mantissa is a logical one (except for special cases such as zero, infinities, and unrepresentable numbers). During a normalized floating-point addition, one of the mantissas of the addend and adder is shifted and the exponent is incremented or decremented until the exponents for both the addend and adder are equal. This shifting process is known as alignment. Once aligned, the mantissas of the addend and adder are added or subtracted depending upon the signs of the addend and adder as well as the type of operation (either addition or substraction) to be performed. Once the result (either sum or difference) is formed, depending upon the operation, the sign of the resulting mantissa is examined. If the sign of the result is negative, the boolean complement of the result is initially formed and the sign is then complemented. In order to convert the result to a normalized form, the exponent of the result is decremented and the mantissa of the result is left-shifted until the leading digit of the mantissa is a logical one (in absence of exceptional conditions such as those mentioned supra).

The determination of how many leading zeros or leading ones need to be removed (i.e., the amount of left-shifting) is preferably accomplished in parallel with the arithmetical operations within the floating-point adder. Such concurrency is important because even a few clock cycles may have a major performance impact on the composite speed of the floating-point processor. The present disclosure describes an improved LZA architecture that provides a significant speed improvements over its predecessors.

SUMMARY OF THE INVENTION

In view of the foregoing, it is therefore an object of the present invention to provide an improved method and apparatus for data processing.

It is another object of the present invention to provide an improved method and apparatus performing result normalization in a floating-point processor.

It is yet another object of the present invention to provide an improved method and apparatus for anticipating leading zeros/ones in a floating-point processor.

In accordance with the method and system of the present invention, a leading zeros string and a leading ones string is generated by examining carry propagates, generates, and kills of two adjacent bits of two input operands to an adder within a floating-point processor. The leading zeros string is for a positive sum, and the leading ones string is for a negative sum. A normalization shift amount is calculated directly and concurrently from the leading zeros string and the leading ones strings prior to a determination of a sign of an output of the positive sum and the negative sum.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in a variety of processors having a floating-point adder. The processor may be, for example, a reduced instruction set computer (RISC) processor or a complex instruction set computer (CISC) processor. For the purpose of illustration, a preferred embodiment of the present invention, as described below, is implemented on a RISC processor, such as the PowerPC™ processor manufactured by International Business Machines Corporation of Armonk, N.Y.

Figure 1:
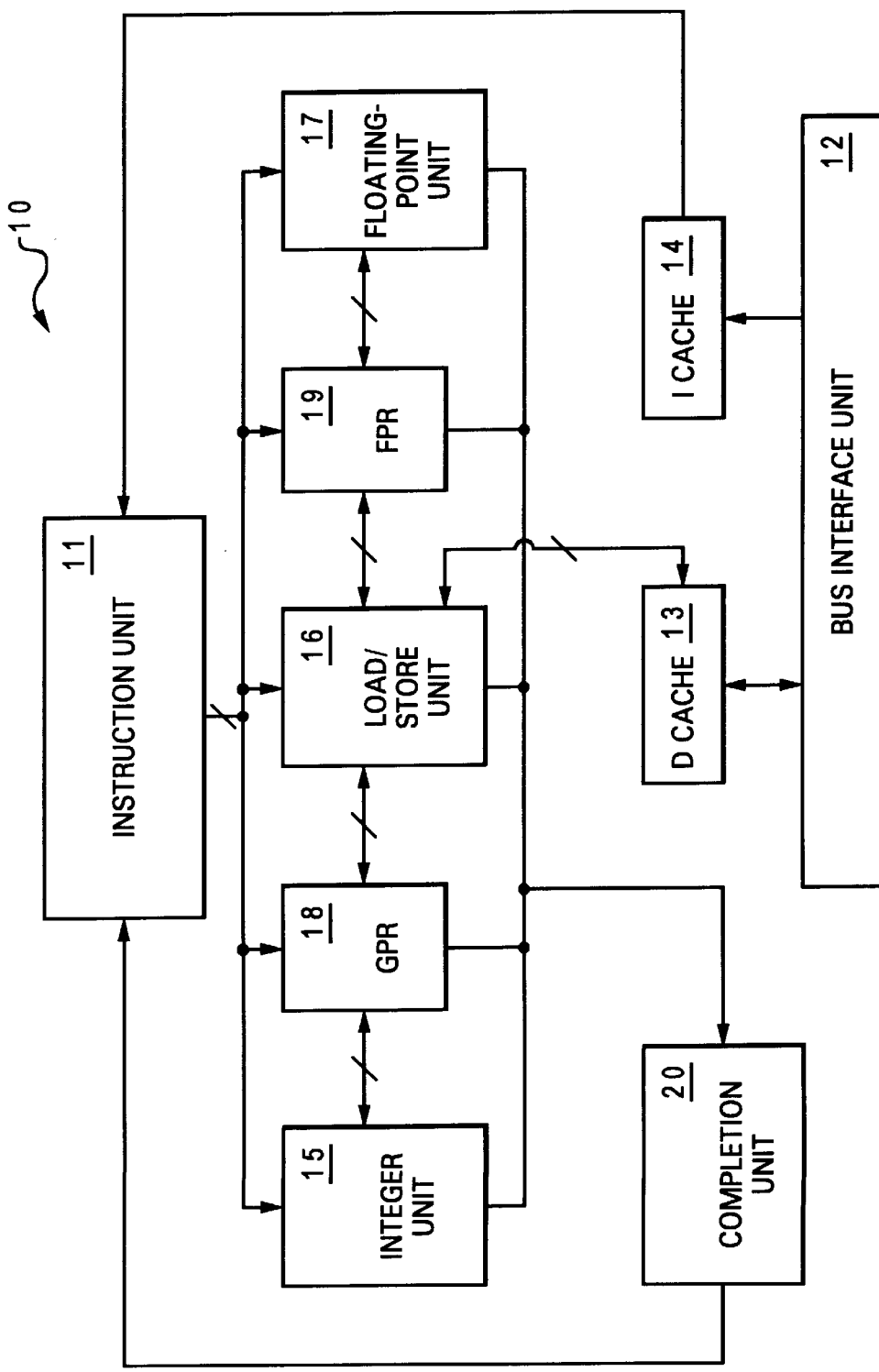
FIG. 1 is a block diagram of a processor in which a preferred embodiment of the present invention may be incorporated.

Referring now to the drawings and in particular to FIG. 1, there is depicted a block diagram of a processor in which a preferred embodiment of the present invention may be incorporated. Within a processor 10, a bus interface unit 12 is coupled to a data cache 13 and an instruction cache 14. Both data cache 13 and instruction cache 14 are high speed set-associative caches which enable processor 10 to achieve a relatively fast access time to a subset of data or instructions previously transferred from a main memory (not shown). Instruction cache 14 is further coupled to an instruction unit 11 which fetches instructions from instruction cache 14 during each execution cycle.

Processor 10 also includes at least three execution units, namely, an integer unit 15, a load/store unit 16, and a floating-point unit 17. Each of execution units 15–17 can execute one or more classes of instructions, and all execution units 15–17 can operate concurrently during each processor cycle. After execution has terminated, execution units 15–17 store data results to a respective rename buffer, depending upon the instruction type. Then, any one of execution units 15–17 may signal a completion unit 20 that the instruction unit has finished execution of an instruction. Finally, instructions are completed in program order, and result data are transferred from the respective rename buffer to a general purpose register 18 or a floating-point register 19, accordingly.

Figure 2:
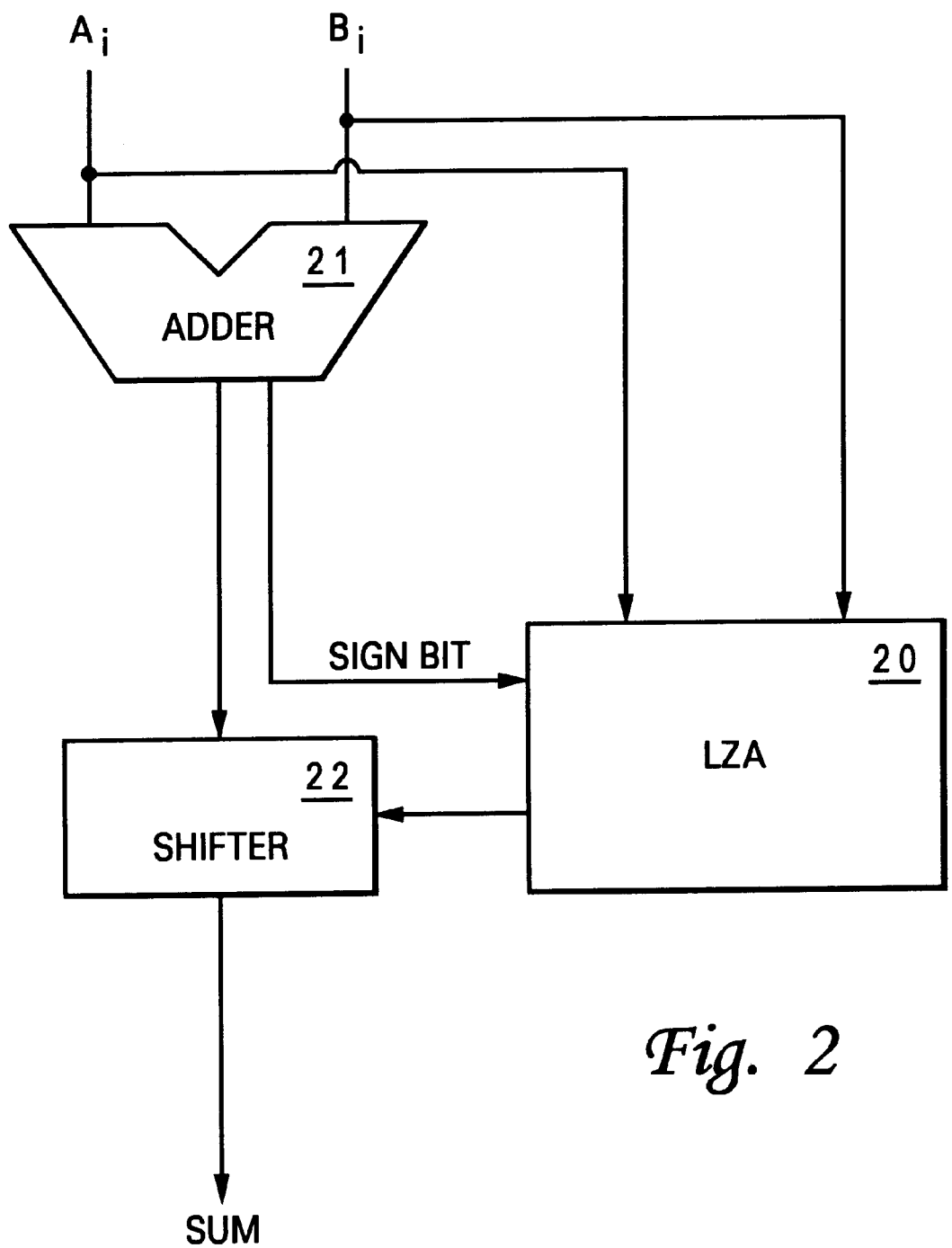
FIG. 2 is a block diagram of a leading zero anticipator (LZA) in relation to a floating-point adder, in is accordance with a preferred embodiment of the present invention.

With reference now to FIG. 2, there is depicted a block diagram of a leading zero anticipator (LZA) in relation to a floating-point adder within floating-point unit 17 from FIG. 1, in accordance with a preferred embodiment of the present invention. As shown, a LZA 20 operates in parallel with the clocked operation of a floating-point adder 21 to determine the number of bit positions that must be introduced by a shifter 22 to normalize the mantissa of a floating-point result of the addition of input operands $A_i$ and $B_i$. In order to speed up the normalization process, the mantissas of the addend and adder (or subtrahend and subtractor) are examined to predict the position of the leading logical zeros (or ones) of the floating-point result. This prediction is performed during the addition (or substraction) operation such that the amount of shifting necessary for the normalization process is known as soon as the result is available. In accordance with a preferred embodiment of the present invention, the normalization amount is calculated concurrently for a positive and a negative result prior to the determination of a sign of the result. Subsequent normalization shifts are performed in response to the sign of the result in the encoding process. Broadly speaking, the present invention examines carry propagates ($P_i$), generates ($G_i$) and kills ($Z_i$) of two adjacent bits of the input operands to the adder to generate a leading zeros string for a positive sum and a leading ones string for a negative sum. $P_i$ is determined by $A_i$ XOR $B_i$, $G_i$ is determined by $A_i$ AND $B_i$, and $Z_i$ is determined by $\overline{A}_i$ AND $\overline{B}_i$. Because the sign of the result is not known initially, two strings are computed. The positive sum string determines the location of the first non-zero digit in a positive sum. For each bit position in the string a logical one in the sum string indicates a potential location of the first non-zero bit in the sum. By examining the positive sum string from the most significant to the least significant position, the true first non-zero position is determined. The negative sum string determines the location of the first non-zero digit in a negative sum. For each bit position in the string a logical one in the sum string indicates a potential location of the first non-one bit in the sum. By examining the negative sum string from the most significant to the least significant position, the true first non-one position is determined.

Figure 3:
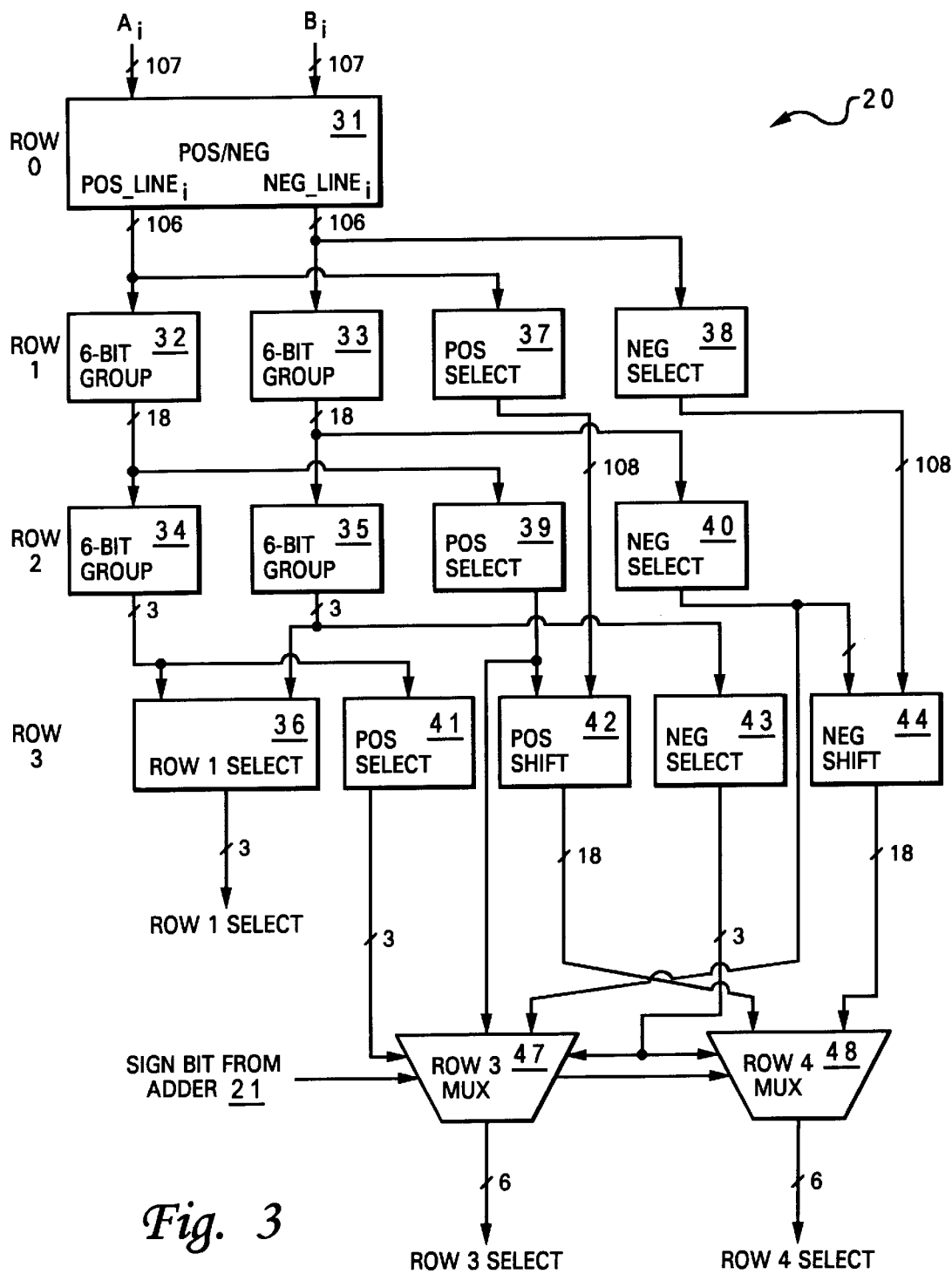
FIG. 3 is a detailed block diagram of the LZA from FIG. 2, in accordance with a preferred embodiment of the present invention.

Referring now to FIG. 3, there is illustrated a detailed block diagram of LZA 20 from FIG. 2, in accordance with a preferred embodiment of the present invention. As shown, positive leading zero line POS_LINE$_i$ and negative leading zero line NEG_LINE$_i$ are calculated concurrently from input operands $A_i$ and $B_i$ via a POS/NEG module 31. For the purpose of illustration, each of operands $A_i$ and $B_i$ is 107 bits in length. The positive leading zero line POS_LINE$_i$ and negative leading zero line NEG_LINE$_i$ are calculated as follows:

$$\text{POS\_LINE}_i = P_i \otimes Z_{i+1} \quad (1)$$

$$\text{NEG\_LINE}_i = P_i \otimes G_{i+1} \quad (2)$$

where $P_i = A_i$ XOR $B_i$, $G_i = A_i$ AND $B_i$, and $Z_i = \overline{A}_i$ AND $\overline{B}_i$.

The positive leading zero line POS_LINE$_i$, which is 106 bits in length, is then divided into 18 groups under Pos Group 32 in row 1, each group having six bits. All six groups are evaluated concurrently, and one bit is computed for each of the 18 groups from Pos Group 32. Each bit represents the logical OR of the six bits within a group. These 18 bits are then divided into three groups under Pos Group 34 in row 2, each group having six bits. All three groups are evaluated concurrently, and one bit is computed for each of the three groups from Pos Group 34. Each bit represents the logical OR of the six bits within a group. Similarly, the negative leading zeros line NEG_LINE$_i$, which is 106 bits in length, is divided into 18 groups under Neg Group 33 in row 1, each group having six bits. All six groups are evaluated concurrently, and one bit is computed for each of the 18 groups from Neg Group 33. Each bit represents the logical OR of the six bits within a group. These 18 bits are then divided into three groups under Neg Group 35 in row 2, each group having six bits. All three groups are evaluated concurrently, and one bit is computed from each of the three groups from Neg Group 35. Each bit represents the logical OR of the six bits within a group. Finally, the six bits in row 2 (three bits from the POS_LINE$_i$ and three bits from the NEG_LINE$_i$) are priority encoded within ROW 1 select 36 to form the selection of the normalization amount in groups of 36 bits. Thus, these three bits correspond to a normalization shift of 0, 36, or 72 bit positions.

All of the above selections are performed by a 12-bit shift-control. For example, if a logical one exists in the first six-bit group within Pos Group 34, a 12-bit shift control calculated from the first six-bit group will be selected. However, if there is no logical one in the first six-bit group but there is a logical one in the second six-bit group, the 12-bit shift control calculated from the second six-bit group will be selected. Otherwise, the 12-bit shift control generated from the third six-bit group will be selected.

The logical expression for the six-bit group logic in row 1 can be summarized as follows:

$$POS\_GRP\_1 = POS\_LINE_0 \lor POS\_LINE_1 \lor \cdots POS\_LINE_5$$
$$POS\_GRP\_2 = POS\_LINE_6 \lor POS\_LINE_7 \lor \cdots POS\_LINE_{11}$$
$$\vdots$$
$$POS\_GRP\_18 = POS\_LINE_{100} \lor POS\_LINE_{101} \lor \cdots POS\_LINE_{105}$$

and $$NEG\_GRP\_1 = NEG\_LINE_0 \lor NEG\_LINE_1 \lor \cdots NEG\_LINE_5$$
$$NEG\_GRP\_2 = NEG\_LINE_6 \lor NEG\_LINE_7 \lor \cdots NEG\_LINE_{11}$$
$$\vdots$$
$$NEG\_GRP\_1 = NEG\_LINE_{100} \lor NEG\_LINE_{101} \lor \cdots NEG\_LINE_{105}$$

where v is a boolean operator OR.

In the meantime, the positive leading zero line POS_LINE$_i$ is also divided into 18 groups under Pos Select 37 in row 1, each group having six bits. All 18 groups are evaluated concurrently. For each of group of 6-bits, the most significant logical "1" in each group is found. The output of the Pos Select 37 is 6 bits in which a "1" in the output signifies the position of the most significant "1" in this group and a "0" indicates a position that does not contain the most significant "1" in the group. One bit is selected from each of the 18 groups from Pos Select 37.

Similarly, the negative leading zero line NEG_LINE$_i$ is divided into 18 groups under Neg Select 38 in row 1, each group having six bits. All 18 groups are evaluated concurrently. For each of group of 6-bits, the most significant logical 1 in each group is found. The output of the Neg Select 38 is 6 bits in which a "1" in the output signifies the position of the most significant "1" in this group and a "0" indicates a position that does not contain the most significant "1" in the group. One bit is selected from each of the 18 groups from Neg Select 38.

In addition, the 18 bits from Pos Group 32 in row 1 are then divided into three groups under Pos Select 39 in row 2, each group having six bits. All three groups are evaluated concurrently, and one bit is chosen from each of the three groups from Pos Select 39. Similarly, the 18 bits from Neg Group 33 in row 1 are then divided into three groups under Neg Select 40 in row 2, each group having six bits. All three groups are evaluated concurrently, and one bit is chosen from each of the three groups from Neg Select 40. The output of Pos Select 39 (and similarly Neg Select 40) is 6 bits in which a "1" in the output signifies the position of the group location that contain the most significant "1" of the six groups and a "0" indicates a group position which does not contain the most significant one of the six groups.

Further, in row 3, the three bits from Pos Group 34 are sent to Pos Select 41. The output of Pos Select 41 is 3 bits in which a "1" in the output signifies the position of the group location that contains the most significant "1" of the three groups and a "0" indicates a group position that does not contain the most significant "1" of the three groups. Similarly, the three from Neg Group 35 are encoded to three bits by Neg Select 43.

The 108 bits from Pos Select 37 are sent to Pos Shift 42. Under the control of the 18-bits from Pos Select 37, 18 of the 108 input bits are selected and driven out by Pos Shift 42. These bits represent three sets of six bits that are the location of the most significant "1" within the 6-bit boundary for the possible cases where the first are lies in the first, second and third group of 36 bits in POS LINE. Neg Select 43 produces the same bits for the NEG LINE based upon input from Neg Select 43 and Neg Select 38.

In row 4, the normalization amounts for the third and forth normalizer levels are generated in row 3 multiplexor 47 and row 4 multiplexor 48, respectively. Row 3 multiplexor 47 generates the normalization shift amount of 0, 6, 12, 18, 24 or 30 based upon the sign bit from adder 21 that selects between Pos Select 39 data and Neg Select 40 data and upon the selection conditions of Pos Select 41 and Neg Select 43. Row 4 multiplexor 48 generates the normalization amount of 0, 1, 2, 3, 4, or 5 based upon sign bit, Pos Select 41, the selection conditions of Neg Select 43, and the data inputs of Pos Shift 42 and Neg Shift 44.

As has been described, the present invention provides an improved method and apparatus for anticipating leading zeros/ones and directly computing normalization shift selects in a floating-point processor. The present invention predicts the shift amount for shifting groups of 36 bits. The remainder of the shift amount is determined by the sign signal from a floating-point adder. By predicting the high-order group selects, the outputs of the adder can be shifted immediately. The present invention also provides time for the sign signal to be buffered to drive the second stage of the normalizer.

Although two operands, each having 107 bits in length, are utilized the preferred embodiment of the present invention, it is understood by those skilled in the art that the principle as disclosed is applicable to operands of any length. Further, even though a single adder is utilized to illustrate a preferred embodiment, the present invention may also be applied to a normalized fused multiplier-adder. In normalized fused multiplication-addition, the mantissa of the multiplicand and multiplier form the partial-products that are summed by a partial-product reduction tree. The reduction tree forms a redundant binary form of the multiplication result, which represents the result of the multiplication when added. The redundant binary product is then added to the addend in a carry-save adder to form a redundant result for the fused multiplication-addition operation. The redundant result, sum and carry, are subsequently added in a normalizing floating-point adder, identical to a floating-point addition. Once the sum is formed (sum refers to either sum or difference, depending upon the arithmetic operation), the sign of the resulting mantissa is examined. If the sign of the sum is negative, a boolean complement of the sum is formed and the sign of the result is complemented. To convert the sum to the normalized form, the sum (or its complement if the sum was negative) is normalized. In the normalization process, the exponent is decremented and the mantissa is left-shifted until the leading digit of the mantissa is a logical one (unless an exceptional condition is identified).

While the invention has been particularly shown and described with reference to a preferred embodiment, it will be understood by those skilled in the art that various changes in form and detail may be made therein without departing from the spirit and scope of the invention.

What is claimed is:

1. A method for anticipating leading zeros/ones in a floating-point processor, said method comprising the steps of:

generating a leading zeros string and a leading ones string by examining carry propagates ($P_i$), generates ($G_i$) and kills ($Z_i$) of two adjacent bits of two input operands ($A_i$ and $B_i$) of an adder within said floating-point processor, wherein said leading zeros string is for a positive sum and said leading ones string is for a negative sum; and directly and concurrently calculating a normalization shift amount from said leading zeros string and said leading ones strings prior to a determination of a sign bit of an output of said positive sum and said negative sum from an adder.

2. The method according to claim 1, wherein $P_i$ is determined by $A_i$ XOR $B_i$, $G_i$ is determined by $A_i$ AND $B_i$, and $Z_i$ is determined by $\overline{A_i}$ AND $\overline{B_i}$.

3. The method according to claim 2, wherein said leading zeros string for a positive sum ($POS\_LINE_i$) is generated $P_i \otimes Z_{i+1}$ and said leading ones string for a negative sum ($NEG\_LINE_i$) is generated by $P_i \otimes G_{i+1}$.

4. An apparatus for anticipating leading zeros/ones in a floating-point processor, comprising:

means for generating a leading zeros string and a leading ones string by examining carry propagates ($P_i$), generates ($G_i$) and kills ($Z_i$) of two adjacent bits of two input operands ($A_i$ and $B_i$) of an adder within said floating-point processor, wherein said leading zeros string is for a positive sum and said leading ones string is for a negative sum; and means for directly and concurrently calculating a normalization shift amount from said leading zeros string and said leading ones strings prior to a determination of a sign bit of an output of said positive sum and said negative sum from an adder.

5. The apparatus according to claim 4, wherein $P_i$ is determined by $A_i$ XOR $B_i$, $G_i$ is determined by $A_i$ AND $B_i$, and $Z_i$ is determined by $\overline{A_i}$ AND $\overline{B_i}$.

6. The apparatus according to claim 5, wherein said leading zeros string for a positive sum ($POS\_LINE_i$) is generated $P_i \otimes Z_{i+1}$ and said leading ones string for a negative sum ($NEG\_LINE_1$) is generated by $P_i \otimes G_{i+1}$.

* * * * *

UNITED STATES PATENT AND TRADEMARK OFFICE
CERTIFICATE OF CORRECTION

PATENT NO. : 6,178,437 B1
DATED : January 23, 2001
INVENTOR(S) : Dhong et al.

It is certified that error appears in the above-identified patent and that said Letters Patent is hereby corrected as shown below:

Column 2,
Line 8, please delete "Saslys" and insert -- Salys --.
Line 29, please delete "is".

Column 3,
Line 21, please insert new paragraph with the words -- In accordance --.

Column 5,
Line 32, please insert a space after "4".

Signed and Sealed this

Eleventh Day of December, 2001

*Attest:*

NICHOLAS P. GODICI
*Attesting Officer*   *Acting Director of the United States Patent and Trademark Office*